(12) United States Patent  
Lin

(10) Patent No.: US 11,636,653 B2  
(45) Date of Patent: Apr. 25, 2023

(54) METHOD AND APPARATUS FOR SYNTHESIZING VIRTUAL AND REAL OBJECTS

(71) Applicant: Beijing Xiaomi Mobile Software Co., Ltd., Beijing (CN)

(72) Inventor: Xingsheng Lin, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/222,546

(22) Filed: Dec. 17, 2018

(65) Prior Publication Data

US 2019/0221041 A1    Jul. 18, 2019

(30) Foreign Application Priority Data

Jan. 12, 2018  (CN) .......................... 201810029995.2

(51) Int. Cl.

| | |
|---|---|
| *G06T 19/00* | (2011.01) |
| *H04N 21/4728* | (2011.01) |
| *G06T 11/00* | (2006.01) |
| *G06V 20/20* | (2022.01) |
| *G06V 20/64* | (2022.01) |

(Continued)

(52) U.S. Cl.  
CPC ............. *G06T 19/006* (2013.01); *G06T 7/55* (2017.01); *G06T 7/70* (2017.01); *G06T 11/00* (2013.01); *G06V 20/20* (2022.01); *G06V 20/64* (2022.01); *H04N 21/4728* (2013.01); *G06T 2207/10028* (2013.01); *G06T 2207/30244* (2013.01)

(58) Field of Classification Search  
None  
See application file for complete search history.

(56) References Cited

U.S. PATENT DOCUMENTS

| | | | |
|---|---|---|---|
| 6,166,744 A | | 12/2000 | Jaszlics et al. |
| 9,224,237 B2 * | | 12/2015 | Costello ................. G06T 15/20 |

(Continued)

FOREIGN PATENT DOCUMENTS

| | | |
|---|---|---|
| CN | 102473324 A | 5/2012 |
| CN | 103489214 A | 1/2014 |

(Continued)

OTHER PUBLICATIONS

First Office Action (Enquiry) dated Sep. 18, 2019, in counterpart Russian Application No. 2018143709/08.

(Continued)

*Primary Examiner* — Edward Martello  
(74) *Attorney, Agent, or Firm* — Finnegan, Henderson, Farabow, Garrett & Dunner, L.L.P.

(57) ABSTRACT

A method for synthesizing virtual and real objects, includes: acquiring a target object in an image captured by a terminal device; in a depth information fusion mode, acquiring the depth information of the target object by a camera apparatus of the terminal device, wherein the depth information fusion mode is configured to superimpose a virtual object generated by computer modeling on the image, and the depth information of the target object is configured to indicate a distance between the target object and the terminal device; acquiring the depth information of the virtual object; and superimposing the virtual object on the image based on the depth information of the target object and the depth information of the virtual object.

12 Claims, 6 Drawing Sheets

(51) Int. Cl.
*G06T 7/55* (2017.01)
*G06T 7/70* (2017.01)

(56) References Cited

U.S. PATENT DOCUMENTS

| | | | |
|---|---|---|---|
| 10,444,829 B2 * | 10/2019 | Levesque | G06F 3/011 |
| 2012/0056992 A1 | 3/2012 | Kuroda | |
| 2012/0092328 A1 * | 4/2012 | Flaks | G02B 27/017 |
| | | | 345/419 |
| 2012/0017641 A1 | 7/2012 | Meier et al. | |
| 2013/0051616 A1 | 2/2013 | Makino et al. | |
| 2015/0279103 A1 * | 10/2015 | Naegle | G06T 19/006 |
| | | | 345/633 |
| 2015/0356785 A1 | 12/2015 | Takemoto | |
| 2016/0019718 A1 | 1/2016 | Mukkamala et al. | |
| 2017/0365100 A1 * | 12/2017 | Walton | G06T 7/30 |
| 2018/0012330 A1 * | 1/2018 | Holzer | G06T 11/60 |
| 2018/0165853 A1 * | 6/2018 | Inagi | G06F 3/147 |

FOREIGN PATENT DOCUMENTS

| | | |
|---|---|---|
| CN | 104021590 A | 9/2014 |
| CN | 105931289 A | 9/2016 |
| CN | 106030335 A | 10/2016 |
| CN | 108182730 A | 6/2018 |
| JP | 2002157607 A | 5/2002 |
| JP | 2004145448 A | 5/2004 |
| JP | 2005293142 A | 10/2005 |
| JP | 2012058968 A | 3/2012 |
| JP | 2015114307 A | 6/2015 |
| JP | 2015230695 A | 12/2015 |
| RU | 2606874 C1 | 1/2017 |
| WO | WO 2019/137006 A1 | 7/2019 |

OTHER PUBLICATIONS

Extended Search Report for European Application No. 19151454.6 from the European Patent Office, dated Mar. 11, 2019.
D. E. Breen et al., "Interactive Occlusion and Automatic Object Placement for Augmented Reality", Computer Graphics Forum, Wiley-Blackwell Publishing Ltd, GB, vol. 15, No. 3, Aug. 26, 1996, 12 pgs.
International Search Report for Application No. PCT/CN2018/101241, from the State Intellectual Property Office of China, dated Nov. 26, 2018.
Reconsideration Report by Examiner before Appeal, Japanese Application No. 2018-567578, dated Nov. 20, 2020.
Notification to Grant Patent Right for Invention for Chinese Application No. 201810029995.2, dated Jul. 14, 2022.

* cited by examiner

METHOD AND APPARATUS FOR SYNTHESIZING VIRTUAL AND REAL OBJECTS

CROSS-REFERENCE TO RELATED APPLICATIONS

This application is based upon and claims priority to Chinese Patent Application No. 201810029995.2, filed Jan. 12, 2018, the entire contents of which are incorporated hereinby reference.

TECHNICAL FIELD

The disclosure generally relates to the technical field of image processing, and in particular, relates to a method and apparatus for synthesizing virtual and real objects.

BACKGROUND

AR (Augmented Reality) technology is a technology that increases user perception of the real world through the information provided by a computer system. It can apply virtual information to the real world and superimpose virtual objects generated by computers onto real scenes, thereby realizing the enhancement of reality.

The method for synthesizing virtual and real objects in related art can correctly handle the occlusion relationship between the virtual and real objects in some cases, however, it may require a large amount of calculation, and may be unsuitable for terminal devices, such as a mobile phone or a tablet computer.

SUMMARY

In order to overcome the problems existing in the related art, the present disclosure provides a method and apparatus for synthesizing virtual and real objects, which can correctly display a virtual object in an image captured by a terminal device in real time.

According to a first aspect of the embodiments of the present disclosure, there is provided a method for synthesizing virtual and real objects, applied to a terminal device. The method includes: acquiring a target object in an image captured by the terminal device; in a depth information fusion mode, acquiring depth information of the target object by a camera apparatus of the terminal device, wherein the depth information fusion mode is configured to superimpose a virtual object generated by computer modeling on the image, arid the depth information of the target object is configured to indicate a distance between the target object and the terminal device; acquiring depth information of the virtual object; and superimposing the virtual object on the image according to the depth informationof the target object and the depth information of the virtual object.

According to a second aspect of the embodiments of the present disclosure, there is provided a terminal device, including: a processor; a camera apparatus coupled to the processor; and a memory for storing instructions executable by the processor. The processor is configured to: acquire a target object in an image captured by the terminal device; in a depth information fusion mode, acquire depth information of the target object by the camera apparatus of the terminal device, wherein the depth information fusion mode is configured to superimpose a virtual object generated by computer modeling on the image, and the depth information of the target object is configured to indicate a distance between the target object and the terminal device; acquire depth information of the virtual object; and superimpose the virtual object on the image according to the depth information of the target object and the depth information of the virtual object.

According to a third aspect of the embodiments of the present disclosure, there is provided a non-transitory computer-readable storage medium having stored therein instructions that, when executed by a processor of a terminal device, cause the terminal device to perform a method for synthesizing virtual and real objects, the method comprising: acquiring a target object in an image captured by the terminal device; in a depth information fusion mode, acquiring depth information of the target object by a camera apparatus of the terminal device, wherein the depth information fusion mode is configured to superimpose a virtual object generated by computer odeling on the image, arid the depth information of the target object is configured to indicate a distance between the target object and the terminal device; acquiring depth information of the virtual object; and superimposing the virtual object on the image according to the depth information of the target object and the depth information of the virtual object.

The technical solutions provided by the embodiments of the present disclo sure may include the following beneficial effects: the objects with different depth information have different occlusion relationships, in the embodiments of the present disclosure, after acquiring the target object, the terminal device superimposes the virtual objecton the image captured by the terminal device according to the depth information of the target object and the depth information of the virtual object; in this way, the superimposing method is determined based on the comparison result of the depth information when the target object is acquired, rather than directly superimposing the virtual object without comparing the depth information of the target object and the depth information of the virtual object or superimposing the virtual object after comparing the depth information of all objects and the depth information of the virtual object. The technical solutions in the embodiments of the present disclosure can reduce the amount of calculation during the superimposing process, and can be applied to AR applications in the terminal device. Moreover, the embodiments of the present disclosure utilize the camera apparatus of the terminal device to acquire the depth information of the target object, which is beneficial to the application of the embodiments in the terminal device. Therefore, the method and apparatus for synthesizing virtual and real objects according to various aspects of the present disclosure can display correctly the virtual object on the image captured by the terminal device in real time.

It is to he understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the invention. Instead, they are merely examples of apparatuses and methods consistent with aspects related to the invention as recited in the appended claims.

Figure 1:
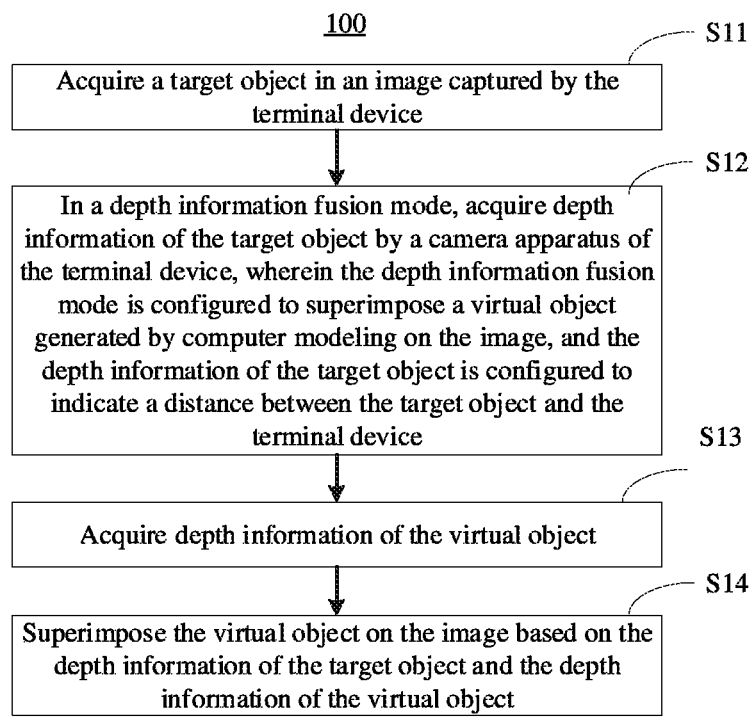
FIG. 1 is a flow chart of a method for synthesizing virtual and real objects according to an exemplary embodiment.

FIG. 1 is a flow chart of a method 100 for synthesizing virtual and real objects according to an exemplary embodiment. Referring to FIG. 1, the method 100 for synthesizing virtual and real objects is applied to a terminal device, such as a mobile phone, a tablet computer, etc. The method 100 for synthesizing virtual and real objects includes the following steps.

In step S11, a target object in an image captured by the terminal device is acquired.

The image captured by the terminal device may be an image corresponding to a real scene, and the image may be captured by a camera apparatus of the terminal device. In exemplary embodiments, the terminal device may capture the image in real time, or the terminal device may continuously capture a plurality of images. It can be understood that a plurality of real-time images continuously captured by the terminal device may constitute a video.

The target object may correspond to a real object in a real scene, for example, may be a real person or a real object. The target object may be a certain specific object in the real scene or a certain type of objects in the real scene. For example, when there are a plurality of persons in the real scene, the target object may be a certain person among the plurality of persons in the real scene, or may be all the persons in the real scene. In an example, the target object may be an object that has an occlusion relationship with the virtual object. The target object will not be limited in this present disclosure.

In one exemplary embodiment, the terminal device may recognize and acquire a target object in the image by the image recognition technology in the related art.

In one exemplary embodiment, the target object may move in the image captured by the terminal device, for example, a person may walk around in the real scene. In one exemplary embodiment, the target object may enter into or disappear from the image, for example, a person may enter into the real scene or leave the real scene.

In step S12, in a depth information fusion mode, depth information of the target object is acquired by a camera apparatus of the terminal device, wherein the depth information fusion mode is configured to superimpose a virtual object generated by computer modeling on the image, and the depth information of the target object is configured to indicate a distance between the target object and the terminal device.

In exemplary embodiments, a virtual object may be superimposed onto a real scene using AR technology. The virtual object may be used to indicate the object generated by computer modeling, such as virtual people, objects, etc. The virtual object may be a mathematical model established by a computer, and the mathematical model may include data representing features of the virtual object such as outlines, textures. Such data may he extracted based on real objects such as real people, objects, etc., or may be artificially created according to the need. The image may be rendered based on the data, to present the virtual object in the real scene. The position of a virtual object may be changed by the terminal device, so that the virtual object moves in the image corresponding to the real scene. In the present disclosure, the manners of generating the virtual objects are not limited.

In exemplaryembodiments, a virtual object may he generated locally by a terminal device or obtained from one or more other devices. The terminal device may adjust the virtual object locally after the virtual object is acquired from other devices.

In exemplary embodiments, the terminal device may directly display the virtual object when the target object is not acquired or before displaying the captured image. For example, the terminal device may display the virtual object on a layer above the layer on which the image is located. In this way, the terminal device can quickly and conveniently superimpose the virtual object on the real scene. The present disclosure does not limit the operation when the arget object is not acquired.

In exemplary embodiments, the terminal device may start a depth information fusion mode when the target object is acquired. The depth information fusion mode may be configured to superimpose a virtual object on the image. For example, the depth information fusion mode may determine an occlusion relationship between the virtual object and the target object based on the depth information, and then determine a manner of superimposing the virtual object on the image according to the occlusion relationship. In the depth information fusion mode, the fusion of virtual objects in the terminal device is relatively more realistic. When the target object is obtained, there might be an object in the image captured by the terminal device that has an occlusion relationship with the virtual object. In this case, incorrect occlusion may cause a poor fusion effect, and some scenarios cannot be implemented. Therefore, the terminal device may start the depth information fusion mode for achieving relatively more realistic fusion.

In exemplary embodiments, the target object is a person and the virtual object is a stool. When the person is acquired, the deep depth information fusion mode may be activated, thereby realizing the scene in which the person stands in front of the stool or sits on the stool, etc.

The depth information of the target object is configured to indicate a distance between the target object and the terminal device. The realistic objective world is a three-dimensional space, and it may become a two-dimensional image which loses the third-dimensional depth information after being imaged by the camera apparatus. Therefore, the terminal device may acquire the depth information of the target object through the camera apparatus.

In exemplary embodiments, the camera apparatus of the terminal device includes at least two cameras, and the terminal device may determine the depth information of the target object according to a position relationship between the target object and the at least two cameras and a distance between the at least two cameras.

Taking the camera apparatus of the terminal device including two cameras as an example, the terminal device may determine the depth information of the target object according to angles formed by two connection lines between the target object and the two cameras and a connection line between the two cameras, and the distance of the two cameras. The above is only one example of determining the depth information of the target object, and the terminal device may also determine the depth information of the target object according to other manners in the related art.

In step S13, depth information of the virtual object is acquired.

The terminal device may place a virtual model corresponding to the virtual object at different positions of the captured image, and may move the position of the virtual model. The virtual object is not an object really existing in the image captured by the terminal device, and it corresponds to one virtual model. The virtual model may be called a virtual object when being displayed on an image.

In exemplary embodiments, the depth information of the virtual object may be fixed. Taking the virtual model generated locally by the terminal device as an example, the terminal device may record a corresponding relationship between the virtual model and the depth information in the process of generating the virtual model. At this time, when the virtual model is moved in the image, the depth information of the virtual model remains unchanged. In exemplary embodiments, the terminal device may acquire depth information corresponding to the virtual object according to the corresponding relationship between the virtual model and the depth information.

In exemplary embodiments, the depth information of the virtual object may change with the movement of the virtual model in the image. Taking the virtual model generated locally by the terminal device as an example, the terminal device may record the depth information in position information of the virtual model in the process of generating the virtual model, and may use the position information of the virtual model as the position information of the virtual object. At this time, when the virtual model moves in the image, the depth information of the virtual model is associated with the position of the virtual model in the image. In exemplary embodiments, the terminal device may acquire position information of the position of the virtual object, and determine the depth information of the virtual object according to the position information.

In step S14, the virtual object is superimposed on the image based on the depth information of the target object and the depth information of the virtual object.

It may be understood that the farther a distance between the object in the image and the camera apparatus of the terminal device is, the larger the depth information is. An object with relatively large depth information may be blocked by an object having relatively small depth information, and only a part of an object having relatively large depth information may be displayed in the captured image of the terminal device.

Figure 2:
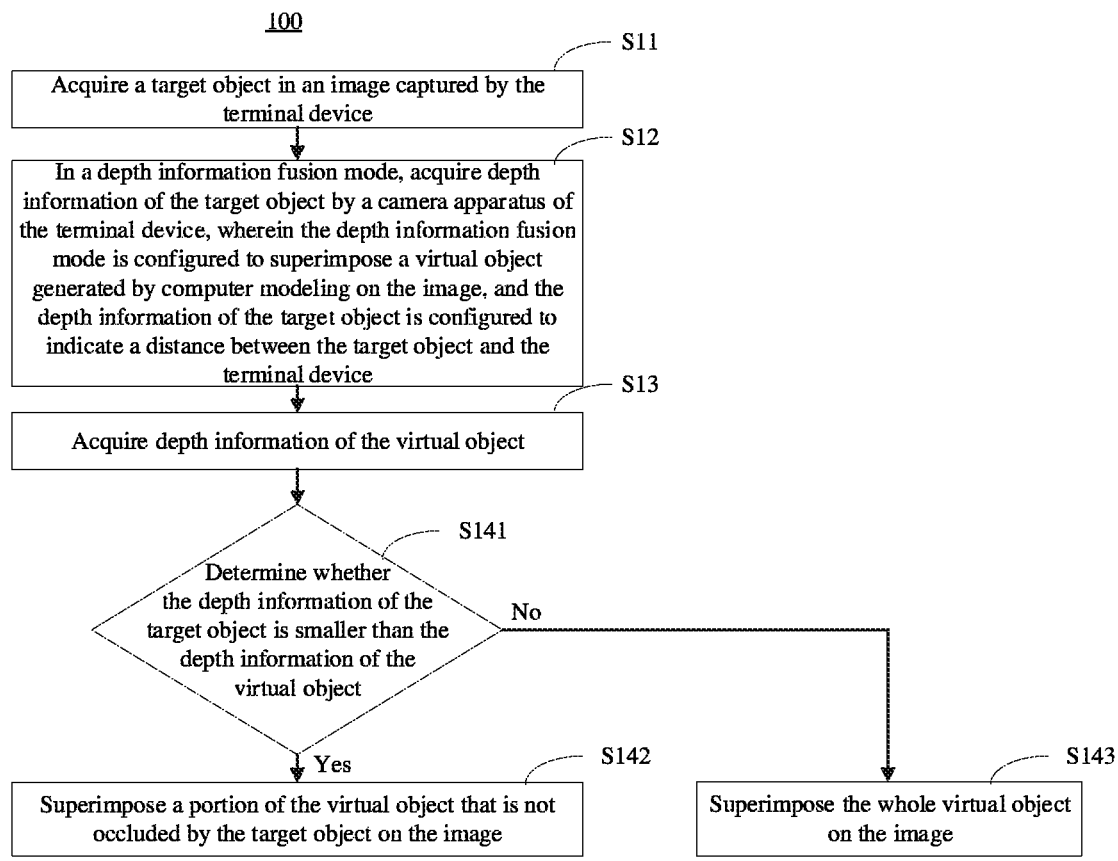
FIG. 2 is a flow chart of a method for synthesizing virtual and real objects according to an exemplary embodiment.

FIG. 2 is a flow chart of the method 100 for synthesizing virtual and real objects according to an exemplary embodiment. As shown in FIG. 2, step S14 (FIG. 1) includes the following steps.

In step S141, it is determined whether the depth information of the target object is smaller than the depth information of the virtual object. When the depth information of the target object is smaller than the depth information of the virtual object, step S142 is performed; otherwise, step S143 is performed.

In step S142, a portion of the virtual object that is not occluded by the target object is superimposed on the image.

In exemplary embodiments, a pixel position of each pixel point of the target object and a pixel position of each pixel point of the virtual object may be obtained. When the pixel point of the target object and the pixel point of the virtual object are at the same pixel position, the pixel point of the virtual object may not be drawn at that position. When there is no pixel point of the target object but the pixel point of the virtual object is on a pixel position, the pixel point of the virtual object may be drawn at that position.

In exemplary embodiments, the target object is a person and the virtual object is a stool, and the depth information of the person is smaller than the depth information of the stool. The terminal device may superimpose a portion of the stool which is not occluded by the person on the image. Thereby, the scene that the person stands in front of the stool or sits on the stool can be presented.

In step S143, the whole virtual object is superimposed on the image.

In exemplary embodiments, the target object is a person and the virtual object is a stool, and the depth information of the person is larger than or equal to the depth information of the stool. The terminal device may superimpose the stool on the image, thereby to present a scene in which the person stands behind the stool or the like.

The occlusion relationships of the objects having different depth information are different. In this embodiment, when the target object is acquired, the terminal device superimposes the virtual object on the image captured by the terminal device based on the depth information of the target object and the depth information of the virtual object. The superimposing method may be determined according to the comparison result of the depth information when the target object is acquired, rather than directly superimposing without comparing, or superimposing after comparing die depth information of all objects. Thereby, it can reduce the amount of calculation during the superimposing process, and can be better applied to AR applications in the terminal device.: Moreover, the embodiments of the present disclosure utilize the camera apparatus of the terminal device to acquire the depth information of the target object, which is beneficial to the application of the embodiments on the terminal device. Therefore, the method 100 for synthesizing virtual and real objects according to the present embodiment can display correctly e virtual object on the image captured by the terminal device in real time.

Figure 3:
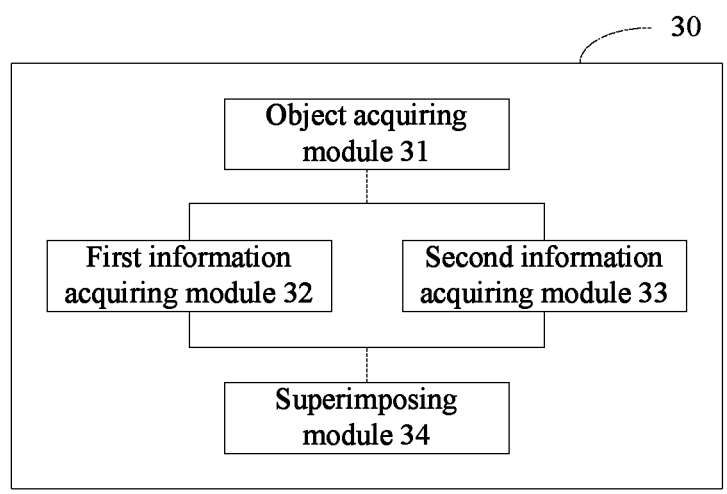
FIG. 3 is a block diagram of an apparatus for synthesizing virtual and real objects according to an exemplary embodiment.

FIG. 3 is a block diagram of an apparatus 30 for synthesizing virtual and real objects according to an exemplary embodiment. Referring to FIG. 3, the apparatus 30 for synthesizing virtual and real objects is applied to a terminal device, and the apparatus 30 includes an object acquiring module 31, a first information acquiring module 32, a second information acquiring module 33, and a superimposing module 34.

The object acquiring module 31 is configured to ac a target object image captured by the terminal device.

The first information acquiring module 32 is configured to acquire depth information of the target object by a camera apparatus of the terminal device in a depth information fusion mode, wherein the depth information fusion mode is configured to superimpose the virtual object generated by computer modeling on the image, and the depth information of the target object is configured to indicate a distance between the target object and the terminal device.

The second information acquiring module 33 is configured to acquire depth information of the virtual object.

The superimposing module 34 is configured to superimpose the virtual object on the image according to the depth information of the target object and the depth information of the virtual object.

Figure 4:
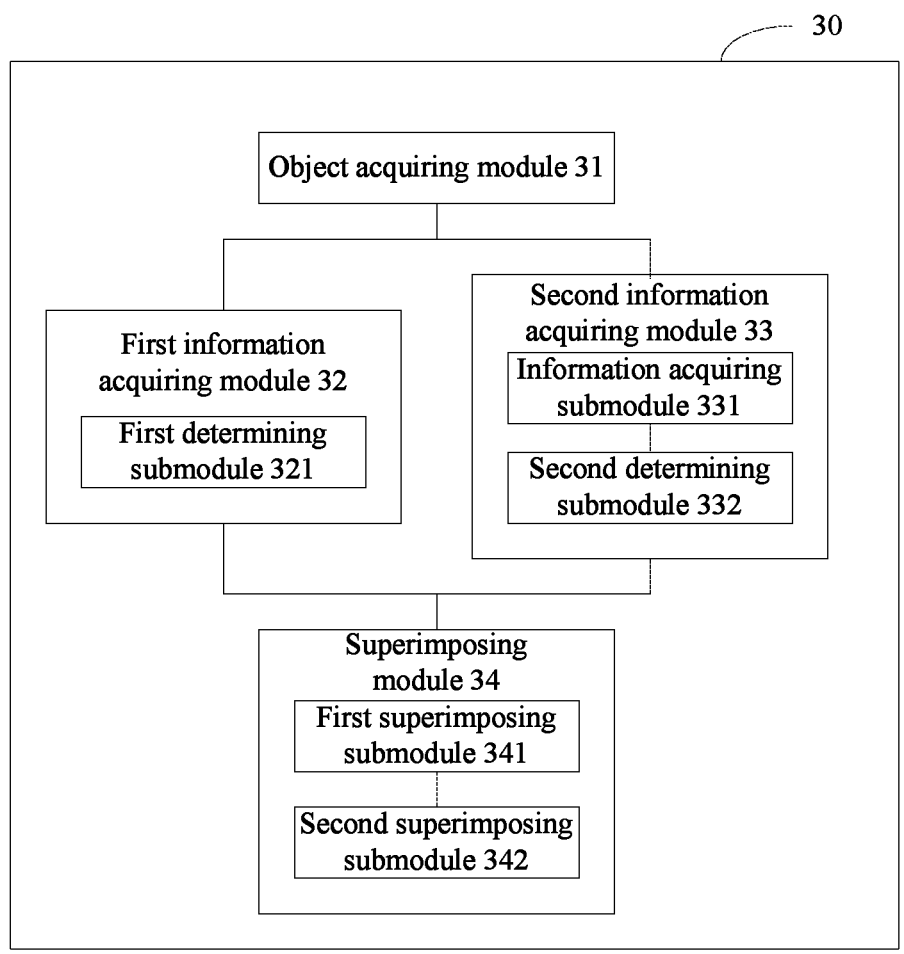
FIG. 4 is a block diagram of an apparatus for synthesizing virtual and real objects according to an exemplary embodiment.

FIG. 4 is a block diagram of the apparatus 30 for synthesizing virtual and real objects according to an exemplary embodiment. Referring to FIG. 4, the superimposing module 34 includes a first superimposing submodule 341.

The first superimposing submodule 341 is configured to, when the depth information of the target object is smaller than the depth information of the virtual object, superimpose a portion of the virtual objectwhich is not obscured by the target object on the image.

In exemplary embodiments, the superimposing module 34 further includes a second superimposing submodule 342.

The second superimposing scibmodule 342 is configured to, when the depth information of the target object is larger than or equal to the depth information of the virtual object, superimpose the whole virtual object on the image.

In exemplary embodiments, the terminal device includes at least two cameras, and the first information acquiring module 32 includes a first determining submodule 321.

The first determining submodule 321 is configured to determine the depth information of the target object according to a position relationship between the target object and the at least two cameras, and a distance between the at least two cameras.

In exemplary embodiments, the second information acquiring module 33 includes an information acquiring submodule 331 and a second determining submodule 332.

The information acquiring submodule 331 is configured to acquire position information of the virtual object in the image.

The second determining submodule 332 is configured to determine the depth information of the virtual object according to position information of the virtual object.

With respect to the apparatuses in the above embodiments, the specific manners for performing operations for individual modules therein have been described in detail in the embodiments regarding the methods, which will not be repeated herein.

Figure 5:
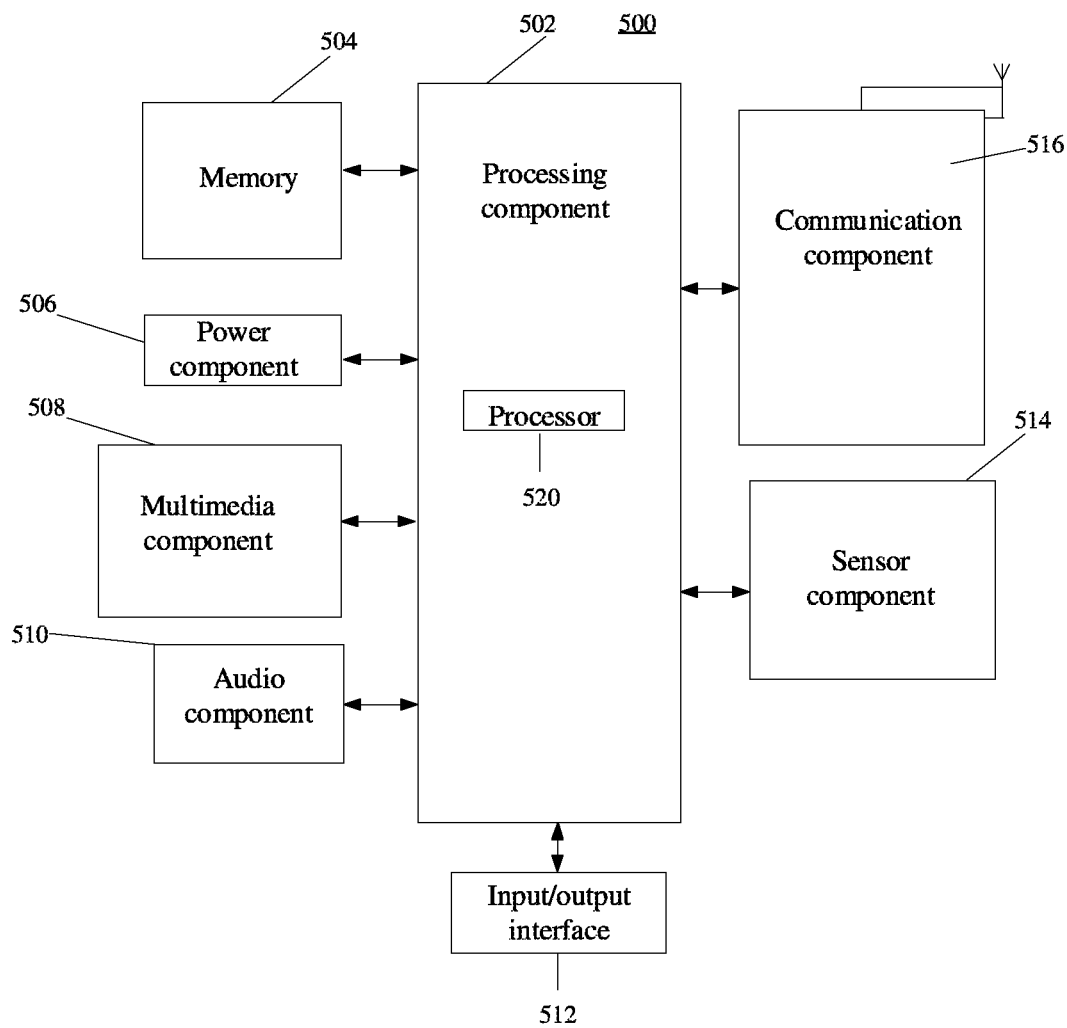
FIG. 5 is a block diagram of an apparatus for synthesizing virtual and real objects according to an exemplary embodiment.

FIG. 5 is a block diagram of an apparatus 500 for synthesizing virtual and real objects according to an exemplary embodiment. For example, the apparatus 500 may be a terminal device, such as a mobile phone, a computer, a digital broadcast terminal, a messaging device, a gaming console, a tablet, a medical device, exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of e apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processingcomponent 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages,pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, magnetic or optical disk.

The power component 506 provides power to various components of the apparatus 500. The power component 506 may include a power management system, one or more power sources, and any other components associated with the generation, management, and distribution of power in the apparatus 500.

The multimedia component 508 includes a screen providing an output interface between the apparatus 500 and the user. In some embodiments, the screen tray include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the apparatus 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the display methods of the application interface provided by the above described embodiments.

In exemplary embodiments,thereis also provided a non-transitory computer readable storage medium including instructions, such as included in the memory 504, executable by the processor 520 in the apparatus 500, for performing the above-described. methods. For example, the non-transitory computer-readable storage medium may be a ROM, a RAM, a CD-ROM, a magnetic tape, a floppy disc, an optical data storage device, and the like.

Figure 6:
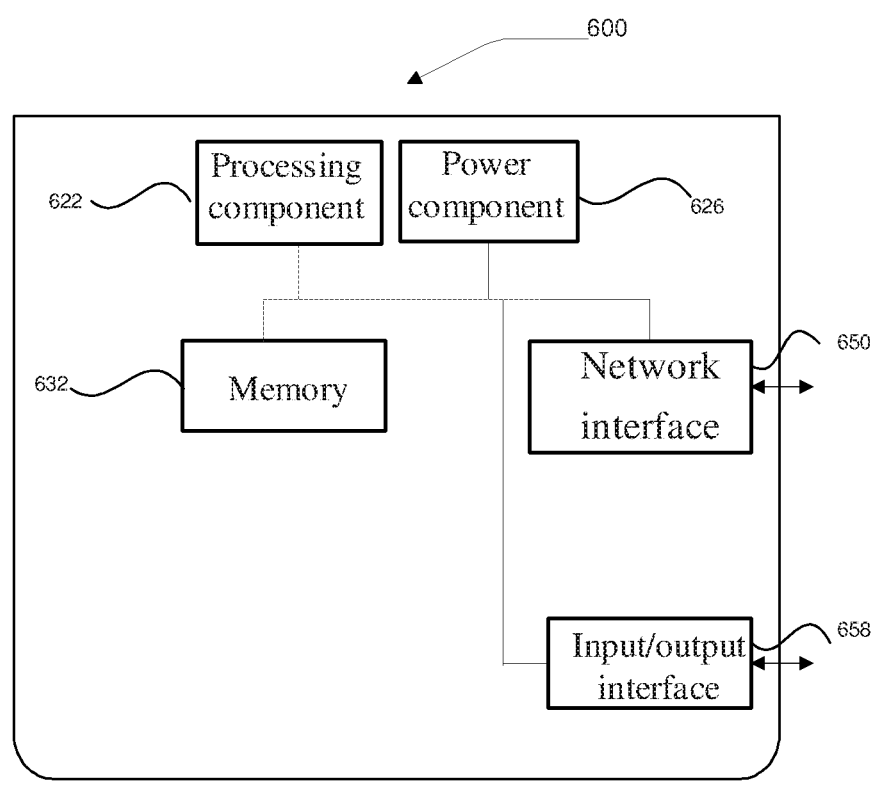
FIG. 6 is a block diagram of an apparatus for synthesizing virtual and real objects according to an exemplary embodiment.

FIG. 6 is a block diagram of an apparatus 600 for synthesizing virtual and real objects according to an exemplary embodiment. For example, the apparatus 600 may be provided as a server. Referring to FIG. 6, the apparatus 600 includes a processing component 622 that further includes one or more processors, and memory resources represented by a memory 632 for storing instructions executable by the processing component 622, such as application programs. The application programs stored in the memory 632 may include one or more modules each corresponding to a set of instructions. Further, the processing component 622 is configured to execute the instructions to perform the above described method.

The apparatus 600 may also include a power component 626 configured to perform power management of the apparatus 600, wired or wireless network interface(s) 650 configured to connect the apparatus 600 to a network, and an input/output (I/O) interface 658. The apparatus 600 may operate based on an operating system stored in the memory 632, such as Windows Server™, Mac OS X™, Unix™, Linux™, FreeBSD™, or the like.

In exemplary embodiments, there is also provided a non-transitory computer-readable storage medium storing instructions, such as a memory 632 including instructions executable by the processor 622 in the apparatus 600. For example, the non-transitory computer-readable storage medium may be a ROM, RAM, a CD-ROM, a magnetic tape, a floppy disc, an optical data storage device, and the like.

One of ordinary skill in the art will understand that the above described modules can each be imple ed by hardware, or software, a combination ardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for synthesizing virtual and real objects, applied to a terminal device, the method comprising:
 acquiring a target object in a two-dimensional image captured by the terminal device;
 in a depth information fusion mode, acquiring depth information of the target object by a camera apparatus of the terminal device, wherein the depth information fusion mode is configured to superimpose a virtual object generated by computer modeling on the two-dimensional image, and the depth information of the target object is configured to indicate a distance between the target object and the terminal device;
 acquiring two-dimensional position information of the virtual object placed in the two-dimensional image;
 calculating, after the target object is acquired, depth information of the virtual object according to the two-dimensional position information of the virtual object placed in the two-dimensional image, wherein the depth information of the virtual object is recorded in the two-dimensional position information of the virtual object, and the depth information of the virtual object changes with the movement of the virtual object in the two-dimensional image; and
 superimposing the virtual object on the two-dimensional image according to a comparison result of the depth information of the target object and the depth information of the virtual object.

2. The method according to claim 1, wherein the superimposing the virtual object on the two-dimensional image according to the comparison result of the depth information of the target object and the depth information of the virtual object comprises:
 when the depth information of the target object is smaller than the depth information of the virtual object, superimposing a portion of the virtual object which is not occluded by the target object on the two-dimensional image.

3. The method according to claim 1, wherein the superimposing the virtual object on the two-dimensional image according to the comparison result of the depth information of the target object and the depth information of the virtual object comprises:
    when the depth information of the target object is larger than the depth information of the virtual object, superimposing the whole virtual object on the two-dimensional image.

4. The method according to claim 1, wherein the camera apparatus of the terminal device includes at least two cameras, and the acquiring the depth information of the target object by the camera apparatus of the terminal device comprises:
    determining the depth information of the target object according to a position relationship between the target object and the at least two cameras, and a distance between the at least two cameras.

5. A terminal device, comprising:
a processor;
a camera apparatus coupled to the processor; and
a memory for storing instructions executable by the processor;
wherein the processor is configured to:
    acquire a target object in a two-dimensional image captured by the terminal device;
    in a depth information fusion mode, acquire depth information of the target object by the camera apparatus of the terminal device, wherein the depth information fusion mode is configured to superimpose a virtual object generated by computer modeling on the two-dimensional image, and the depth information of the target object is configured to indicate a distance between the target object and the terminal device;
    acquire two-dimensional position information of the virtual object placed in the two-dimensional image;
    calculate, after the target object is acquired, depth information of the virtual object according to the two-dimensional position information of the virtual object placed in the two-dimensional image, wherein the depth information of the virtual object is recorded in the two-dimensional position information of the virtual object, and the depth information of the virtual object changes with the movement of the virtual object in the two-dimensional image; and
    superimpose the virtual object on the two-dimensional image according to a comparison result of the depth information of the target object and the depth information of the virtual object.

6. The terminal device according to claim 5, wherein in superimposing the virtual object on the two-dimensional image according to the comparison result of the depth information of the target object and the depth information of the virtual object, the processor is further configured to:
    when the depth information of the target object is smaller than the depth information of the virtual object, superimpose a portion of the virtual object which is not occluded by the target object on the two-dimensional image.

7. The terminal device according to claim 5, wherein in superimposing the virtual object on the two-dimensional image according to the comparison result of the depth information of the target object and the depth information of the virtual object, the processor is further configured to:
    when the depth information of the target object is larger than the depth information of the virtual object, superimpose the whole virtual object on the two-dimensional image.

8. The terminal device according to claim 5, wherein the camera apparatus of the terminal includes at least two cameras, and in acquiring the depth information of the target object by the camera apparatus of the terminal, the processor is further configured to:
    determine the depth information of the target object according to a position relationship between the target object and the at least two cameras, and a distance between the at least two cameras.

9. A non-transitory computer-readable storage medium having stored therein instructions that, when executed by a processor of a terminal device, cause the terminal device to perform a method for synthesizing virtual and real objects, the method comprising:
    acquiring a target object in a two-dimensional image captured by the terminal device;
    in a depth information fusion mode, acquiring depth information of the target object by a camera apparatus of the terminal device, wherein the depth information fusion mode is configured to superimpose a virtual object generated by computer modeling on the two-dimensional image, and the depth information of the target object is configured to indicate a distance between the target object and the terminal device;
    acquiring two-dimensional position information of the virtual object placed in the two-dimensional image;
    calculating, after the target object is acquired, depth information of the virtual object according to the two-dimensional position information of the virtual object placed in the two-dimensional image, wherein the depth information of the virtual object is recorded in the two-dimensional position information of the virtual object, and the depth information of the virtual object changes with the movement of the virtual object in the two-dimensional image; and
    superimposing the virtual object on the two-dimensional image according to a comparison result of the depth information of the target object and the depth information of the virtual object.

10. The non-transitory computer-readable storage medium according to claim 9, wherein the superimposing the virtual object on the two-dimensional image according to the comparison result of the depth information of the target object and the depth information of the virtual object comprises:
    when the depth information of the target object is smaller than the depth information of the virtual object, superimposing a portion of the virtual object which is not occluded by the target object on the two-dimensional image.

11. The non-transitory computer-readable storage medium according to claim 9, wherein the superimposing the virtual object on the two-dimensional image according to the comparison result of the depth information of the target object and the depth information of the virtual object comprises:
    when the depth information of the target object is larger than the depth information of the virtual object, superimposing the whole virtual object on the two-dimensional image.

12. The non-transitory computer-readable storage medium according to claim 9, wherein the camera apparatus of the terminal device includes at least two cameras, and the acquiring the depth information of the target object by the camera apparatus of the terminal device comprises:
    determining the depth information of the target object according to a position relationship between the target object and the at least two cameras, and a distance between the at least two cameras.

* * * * *